US007990390B2

(12) United States Patent
Law et al.

(10) Patent No.: US 7,990,390 B2
(45) Date of Patent: Aug. 2, 2011

(54) MULTI-PASS SYSTEM AND METHOD SUPPORTING MULTIPLE STREAMS OF VIDEO

(75) Inventors: Patrick Law, Milpitas, CA (US); Darren Neuman, San Jose, CA (US); David Baer, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 273 days.

(21) Appl. No.: 10/386,313

(22) Filed: Mar. 11, 2003

(65) Prior Publication Data

US 2004/0078501 A1 Apr. 22, 2004

Related U.S. Application Data

(60) Provisional application No. 60/420,308, filed on Oct. 22, 2002.

(51) Int. Cl.
*G06T 1/20* (2006.01)
*G06T 1/00* (2006.01)
*G06F 15/16* (2006.01)

(52) U.S. Cl. .......................... 345/506; 345/502; 345/501

(58) Field of Classification Search .................. 345/506, 345/502, 501, 27, 28; 711/218; 712/220; 710/52; 382/303; 348/84
See application file for complete search history.

(56) References Cited

U.S. PATENT DOCUMENTS

| | | | | |
|---|---|---|---|---|
| 5,798,770 A * | 8/1998 | Baldwin | ......................... | 345/506 |
| 6,111,584 A * | 8/2000 | Murphy | ......................... | 345/582 |
| 6,252,610 B1 * | 6/2001 | Hussain | ......................... | 345/506 |
| 6,327,642 B1 * | 12/2001 | Lee et al. | ...................... | 711/120 |
| 6,426,753 B1 * | 7/2002 | Migdal | ......................... | 345/506 |
| 6,456,291 B1 * | 9/2002 | Fowler | ......................... | 345/582 |
| 6,636,214 B1 * | 10/2003 | Leather et al. | ................ | 345/422 |
| 6,919,896 B2 * | 7/2005 | Sasaki et al. | .................. | 345/505 |
| 6,924,821 B2 * | 8/2005 | Trinh et al. | .................... | 345/629 |

FOREIGN PATENT DOCUMENTS

| | | |
|---|---|---|
| EP | 1091318 A2 | 4/2001 |
| WO | WO99/13637 A2 | 3/1999 |
| WO | WO99/222342 A1 | 5/1999 |
| WO | WO00/28518 A2 | 5/2000 |

OTHER PUBLICATIONS

Tong, David. "Frame Buffer FAQ." Feb. 10, 2000. Sun Microsystems, Inc. http://www.sunhelp.org/faq/FrameBuffer.html.*
Lundberg, Magnus. "What is a Bus?" Feb. 19, 2002. Lulea University of Technology. http://www.sm.luth.se/csee/courses/smd/137/slides/F11/bus.pdf.*
European Patent Office, Communication with European Search Report, in Application No. 03023929.7, dated Oct. 1, 2010.

* cited by examiner

*Primary Examiner* — Joni Hsu
(74) *Attorney, Agent, or Firm* — McAndrews, Held & Malloy, Ltd.

(57) ABSTRACT

Systems and methods are disclosed for performing multiple processing of data in a network. In one embodiment, the network comprises a first display pipeline that is formed in real time from a plurality of possible display pipelines and that performs at least a first processing step on received data. A buffer stores the processed data and a second display pipeline that is formed in real time from a plurality of possible display pipelines performs at least a second processing step on stored data.

9 Claims, 7 Drawing Sheets

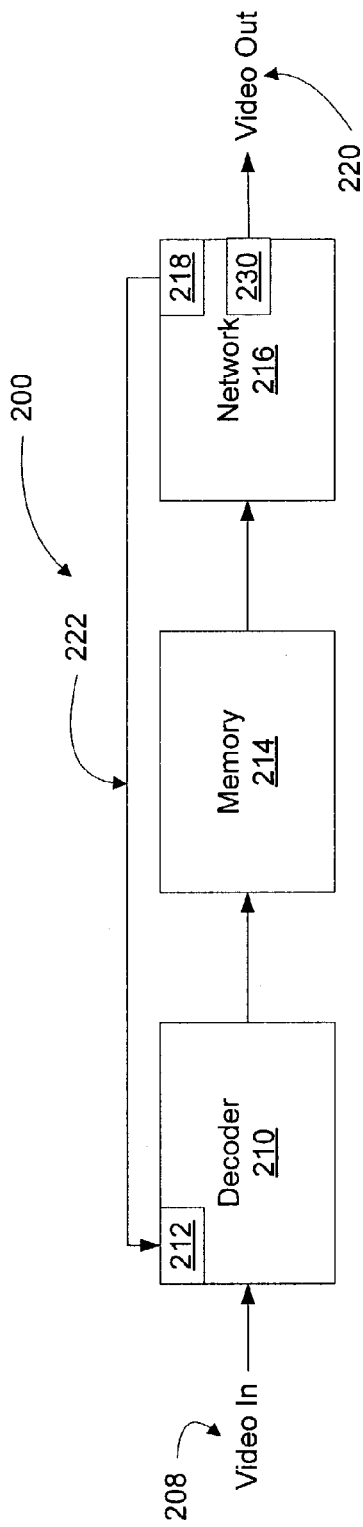
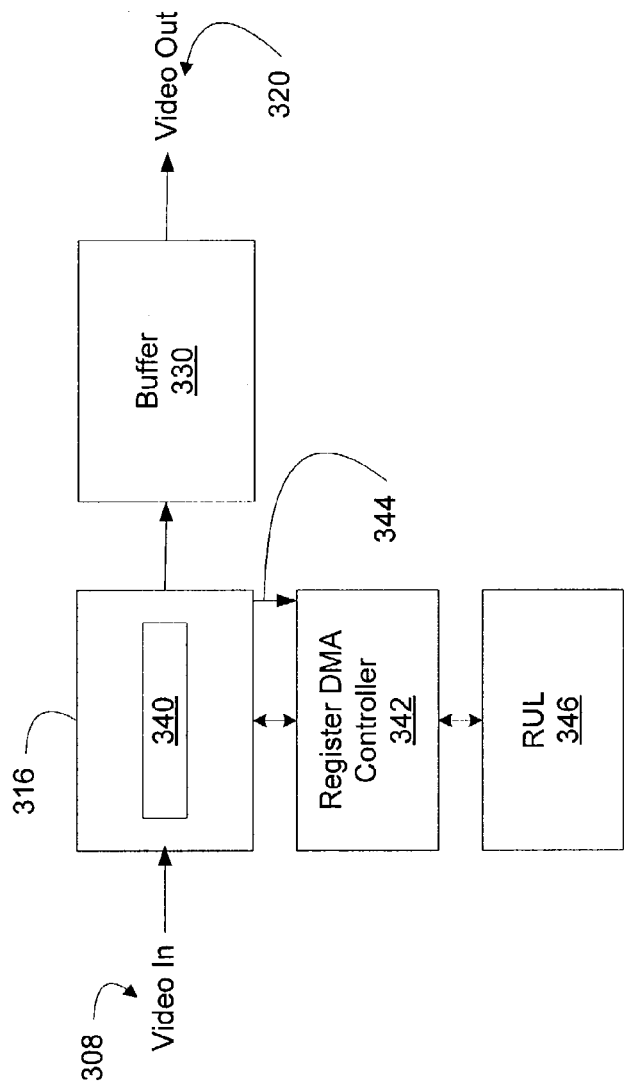

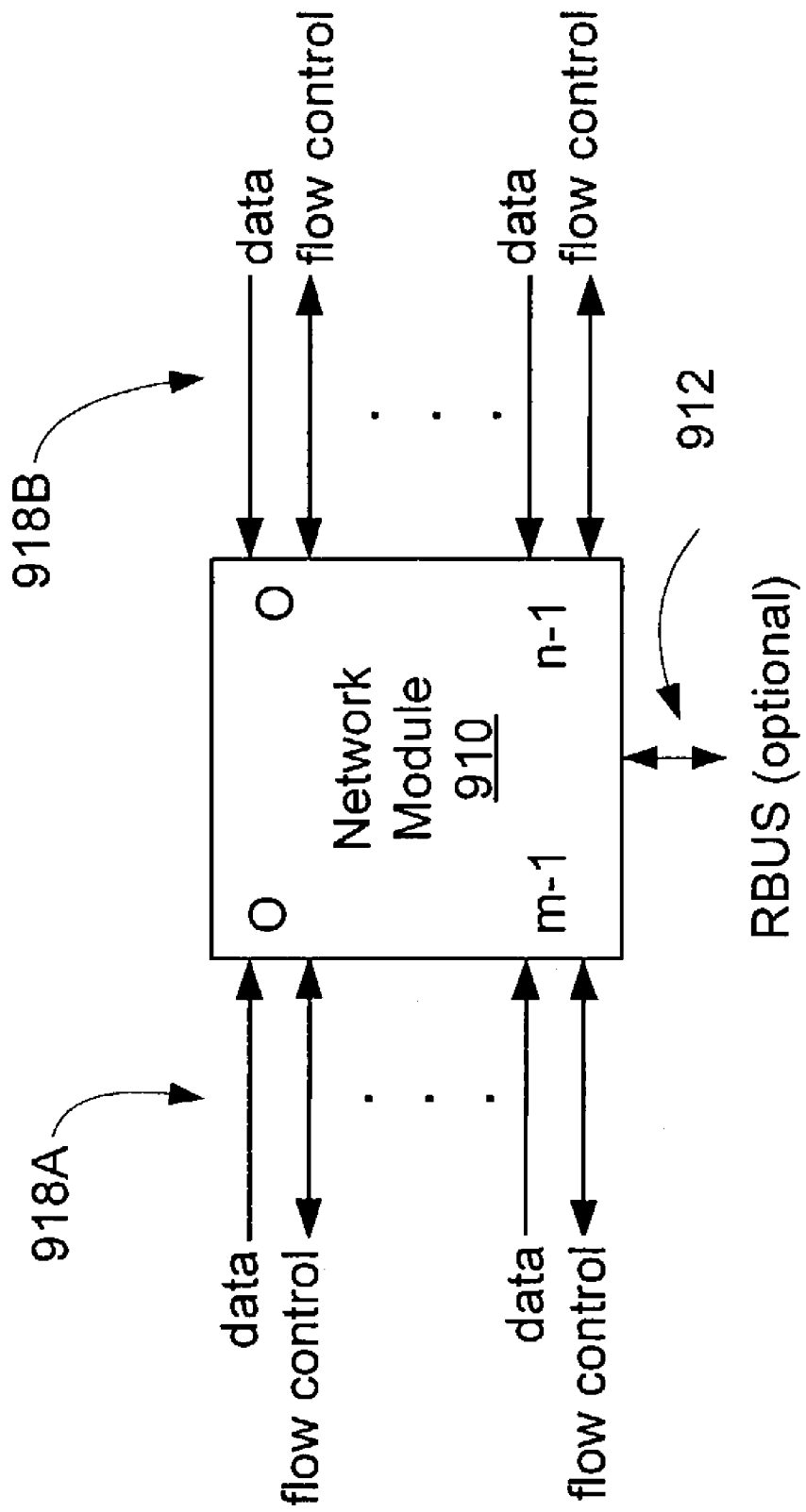

MULTI-PASS SYSTEM AND METHOD SUPPORTING MULTIPLE STREAMS OF VIDEO

CROSS-REFERENCE TO RELATED APPLICATIONS

This application is related to, and claims benefit of and priority from U.S. Provisional Application Ser. No. 60/420,308 filed Oct. 22, 2002, titled "Multi-Pass System and Method Supporting Multiple Streams of Video", the complete subject matter of which is incorporated herein by reference in its entirety.

U.S. Provisional Application Ser. No. 60/420,152 filed Oct. 22, 2002, titled "A/V Decoder Having A Clocking Scheme That Is Independent Of Input Data Streams"; U.S. patent application Ser. No. 10/300,371 filed Nov. 20, 2002, titled "A/V Decoder Having A Clocking Scheme That Is Independent Of Input Data Streams"; U.S. Provisional Application Ser. No. 60/420,136 filed Oct. 22, 2002, titled "NCO Based Clock Recovery System and Method for A/V Decoder"; U.S. patent application Ser. No. 10/313,237 filed Dec. 5, 2002, titled "NCO Based Clock Recovery System and Method for A/V Decoder"; U.S. Provisional Application Ser. No. 60/420,344 filed Oct. 22, 2002, titled "Data Rate Management System and Method for A/V Decoder"; U.S. Provisional Application Ser. No. 60/420,342 filed Oct. 22, 2002, titled "A/V System and Method Supporting a Pull Data Flow Scheme"; U.S. patent application Ser. No. 10/300,234 filed Nov. 20, 2002, titled "A/V System and Method Supporting a Pull Data Flow Scheme"; U.S. Provisional Application Ser. No. 60/420,140 filed Oct. 22, 2002, titled "Hardware Assisted Format Change Mechanism in a Display Controller"; U.S. patent application Ser. No. 10/300,370 filed Nov. 20, 2002 titled "Hardware Assisted Format Change Mechanism in a Display Controller"; U.S. Provisional Application Ser. No. 60/420,151 filed Oct. 22, 2002, titled "Network Environment for Video Processing Modules"; U.S. patent application Ser. No. 10/314,525 filed Dec. 9, 2002 titled "Network Environment for Video Processing Modules"; U.S. Provisional Application Ser. No. 60/420,347 dated Oct. 22, 2002, titled "Video Bus For A Video Decoding System"; and U.S. Provisional Application Ser. No. 60/420,226 filed Oct. 22, 2002, titled "Filter Module for a Video Decoding System" are each incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

The present invention relates to a multi-pass system and method. More specifically, the present invention relates to a multi-pass system and method used in a network environment in an A/V system using "A/V decoders", where the A/V decoders are adapted to process, decode or decompress one or more input data streams (alternatively referred to as "input data", "input data streams" or "data streams").

In general, the front-end of an A/V system or decoder is responsible for producing video while the display engine consumes it. However, it is contemplated that modern display engines may incorporate one or more front-end like features (compositing, graphics overlaying or windowing for example). However, incorporating such front-end like features may require using a significant amount of additional hardware in the system or decoder to display one picture, and thereby may result in a larger and more complex system or decoder that is generally slower and consumes more power.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

There is a need for a method or system to reduce hardware by promoting timesharing between such hardware during data processing. More specifically, there is a need to share or reuse functions between different video streams.

Features of the present invention may be found in a network adapted to perform multiple processing of data. In this embodiment, the network comprises a first display pipeline that is formed in real time from a plurality of possible display pipelines and that performs at least a first processing step on received data. A buffer stores the processed data and a second display pipeline that is formed in real time from a plurality of possible display pipelines performs at least a second processing step on the stored data.

Another embodiment of the present invention relates to a network adapted to perform multiple processing of data. This embodiment comprises a register DMA controller, at least one first node, at least one frame buffer and at least one second node. The register DMA controller is adapted to support register write instructions while the at least one first node is adapted to selectively process the data. The frame buffer is adapted to store the processed data, while the at least one second node is adapted to selectively process the stored data.

Still another embodiment relates to a method of performing multiple processing of data. This embodiment comprises selecting at least one first processing step and processing the data in accordance with the first processing step. The processed data is stored. At least one second processing step is selected. The stored data is received and processed in accordance with the at least one second processing step.

Yet another embodiment relates to a method of performing multiple processing of data in a network. This embodiment comprises forming a first display pipeline from a plurality of possible display pipeline and processing the data in the first display pipeline. The processed data is stored. A second display pipeline is formed from a plurality of possible display pipelines. The stored processed data is retrieved and processed in the second display pipeline.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

FIG. 2 illustrates one embodiment of a block diagram of an A/V system having a network in accordance with the present invention;

FIG. 3 illustrates another embodiment of a block diagram of an A/V system having a network in accordance with the present invention;

FIG. 9 illustrates one embodiment of a network module in accordance with one embodiment of the present invention.

DETAILED DESCRIPTION OF THE INVENTION

The following description is made with reference to the appended figures.

One embodiment of the present invention relates to a network adapted to perform multi-pass operations by capturing the output of a display pipeline in a frame buffer. In one embodiment, an algorithm may be used to control such multi-pass operation.

Figure 1:
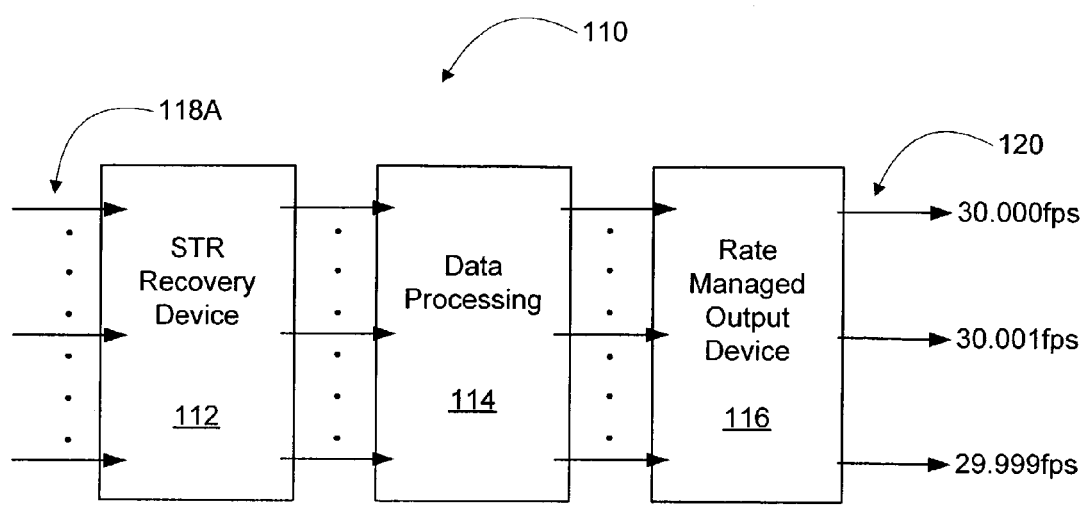
FIG. 1 illustrates one embodiment of a block diagram of an A/V decoder in accordance with the present invention.

FIG. 1 illustrates one embodiment of a high level block diagram of embodiment of an A/V decoder, generally designated 110. More detail about the A/V decoder is provided in U.S. Provisional Application Ser. No. 60/420,152 filed Oct. 22, 2002, titled "A/V Decoder Having A Clocking Scheme That Is Independent Of Input Data Streams" and U.S. patent application Ser. No. 10/300,371 filed Nov. 20, 2002, titled "A/V Decoder Having A Clocking Scheme That Is Independent Of Input Data Streams", the complete subject matter of each of which is incorporated herein by reference in its entirety. In the illustrated embodiment, the decoder 110 comprises a system time reference recovery device 112 (alternatively referred to as an "STR recovery device") having one or more input data streams 118.

The STR recovery device 112 is illustrated communicating with an A/V data processing device 114. In one embodiment of the invention, STR refers to a reference time value. It is anticipated that different or more complex systems are also possible and within the scope of the present invention. For example if the A/V decoder 110 has more than one data source, the decoder may include more than one STR recovery device, where the number of STR recovery devices may or may not correspond to the number of data sources. More detail about the STR recovery devices is provided in U.S. Provisional Application Ser. No. 60/420,136 filed Oct. 22, 2002, titled "NCO Based Clock Recovery System and Method for A/V Decoder" and U.S. patent application Ser. No. 10/313,237 filed Dec. 5, 2002, titled "NCO Based Clock Recovery System and Method for A/V Decoder", the complete subject matter of each of which is incorporated herein by reference in its entirety.

As an alternative to the MPEG scheme, an A/V system incorporating an A/V decoder may accept analog television signals as inputs. In this embodiment, the analog video input goes through, and is processed or decoded by, the A/V data processing device 114, which may comprise a video decoder or VDEC. Likewise, analog audio goes through, and is processed or decoded by, the A/V data processing device 114 which may further comprise a BTSC audio decoder (alternatively referred to as a "ADEC" or "BTSC").

One embodiment of the present invention uses a system clock (a fixed system clock for example) to control the data processing. More specifically, the system clock may be used to control the data process in a network in accordance with the present invention. It is contemplated that the STR recovery device 112 may be locked to the analog video line rate. The analog hysncs are converted into a psuedo-STR using a simple counter in one embodiment. The STR recovery device 112 locks to this psuedo-STR and broadcasts the recovered STR to the rest of the decoder 110. The broadcast STR is used to control the output rates as provided previously.

FIG. 1 further illustrates a rate managed output device 116, which is illustrated as communicating with the data processing device 114. In the illustrated embodiment, the rate managed output device 116 has one or more A/V outputs 120, which are output at the same or different rates. In FIG. 1, three A/V outputs, generally designated 120, are illustrated. For example, one A/V output is output at 29.999 frames per second (alternatively referred to as "fps"), one is output at 30.001 fps and one is output at 30.000 fps. More detail about data processing devices is disclosed in the U.S. Provisional Application Ser. No. 60/420,342 filed Oct. 22, 2002, titled "A/V System and Method Supporting a Pull Data Flow Scheme" and U.S. patent application Ser. No. 10/300,234 filed Nov. 20, 2002, titled "A/V System and Method Supporting a Pull Data Flow Scheme", the complete subject matter of each of which is incorporated herein by reference.

In one embodiment, the A/V data processing device 114 includes a network environment for video processing modules. The data processing device 114 bases audio and video processing on multiples of a single, fixed clock, a 27 MHz crystal clock for example. It is contemplated that, as a single fixed clock is used, the processing is not constrained by clock boundaries. Video and audio may be muxed between modules. It is further contemplated that such architecture may be made orthogonal, and easy to control.

In accordance with one embodiment, all data, including all audio and video data, is processed by a network environment and transferred using a "pull" model or mode, even though typical A/V streams (e.g., MPEG) are adapted to operate according to a push model or mode. The outputs request data as needed. Each module in the A/V decoder 110 may supply data to its outputs at the rate it is requested. Because a pull model or mode is used, the data processing clock (i.e., the system clock) is not tied to the input data rate. For example, the audio decoder may be clocked at 243 MHz, 133 MHz, or any other reasonable rate. The audio decoder clock does not need to "track" the input data rate.

Conventional A/V decoders use a VCXO or VCXO-PLL to lock the chip clock to the input data rate. However, one embodiment of the present invention uses rate managed output devices 116 and the associated SRC devices to change or adjust the video and audio output rates.

It is contemplated that, in one embodiment of the present invention, the output data rate tracks the STR. If the A/V decoder decodes multiple video streams, there may be multiple STRs. Each output data rate tracks an associated STR. The process of controlling the output rates may be called "rate management." In one embodiment, the rate managed output device 116 (alternatively referred to as a "output rate manager" or "output rate manager PLL"), comprising for example a digital PLL, is used to compare the output rate with the STR, and adjust the output rate accordingly, such that the output data rate matches the STR and the input data rate. In one embodiment the AN decoder may include several output rate managers, one for each output of the AN decoder. More detail about rate managers is provided in U.S. Provisional Application Ser. No. 60/420,344 filed Oct. 22, 2002, titled "Data Rate Management System and Method for A/V Decoder", the complete subject matter of which is incorporated herein by reference.

In general, the front-end of an A/V system or decoder is responsible for producing video while the display engine consumes them. A frame buffer may be placed between the video decoder and the display engine as an intermediate storage.

It is contemplated that display engines may incorporate one or more front-end like features (compositing, graphics overlaying or windowing for example). These features that may be included in the display engine to eliminate or reduce the memory bandwidth required to handle the intermediate results. In accordance with one embodiment of the present invention, it is possible to perform multi-pass operations using a display engine by capturing the output in a frame buffer (for example to down scale a picture for PIP display or for non real-time compositing of a complicated graphics background). In one embodiment, an algorithm may be used to control such multi-pass operation. Using such buffer and algorithm, some functions may be shared or reused between different video streams. Using such multi-pass operation on a network (taking advantage of the network flow control architecture) in accordance with one embodiment of the present invention enables a data throughput greater than the video rate.

FIG. 2 illustrates one embodiment of a block diagram of an A/V system, generally designated 200, having a network in accordance with the present invention. It is contemplated that the illustrated A/V system may be similar to those A/V systems provided previously. It is also contemplated that the network may be used in different systems. In this embodiment, system 200 includes a decoder 210 (an MPEG decoder for example) adapted to receive video inputs or data 208. The decoder 210 includes one or more STR recovery devices 212, used, with a system clock (a fixed system clock for example) to control the data processing similar to that provided previously. However, other decoders, with or without STR recovery devices, are contemplated.

A memory or frame buffer 214 is illustrated coupled to the decoder 210 and receives data therefrom. The memory 214 is shown coupled to network 216 as illustrated, which is adapted to transport and process video or data, outputting video out or data 220. In one embodiment, the network 216 is adapted to support a pull data flow. The network 216 includes one or more counters 218 (coupled to the STR recovery device via feedback loop 222) that, along with the rate managed output device (not shown) control the data rate of the output. In this embodiment, the network 216 includes one or more frame buffers 250 (alone or in same combination with an algorithm), which are adapted to store the output, enabling multiple processing of the data.

FIG. 3 illustrates one embodiment of a block diagram of a network, similar to the network 216 of FIG. 2 in accordance with the present invention. In this embodiment, the network 316 is adapted to receive video-in 308 (from a memory for example) and output video-out 320.

FIG. 3 further illustrates at least one display pipeline 340 inside the network 316. In one embodiment of the present invention, the display pipeline 340 is changeably formed by chaining, coupling or concatenating one or more network nodes together on the fly (i.e., in real time), depending on the network requirements. It is contemplated that the nodes may be re-configured, so that a plurality of display pipelines 340 may be formed, each pipeline having a different functionality depending on the nodes that are concatenated together.

In one embodiment, the output data of a first display pipeline 340 is captured and stored in a frame buffer 330. This captured output data may then be processed in a second display pipeline 340, alone or in combination with other data, or run again through a display pipeline similar to the first display pipeline 340 to perform similar processing thereon.

In this embodiment, a register DMA controller 342 (alternatively referred to as an "RDC" or "bridge") is illustrated coupled to the network 316 and one or more register update lists 346 (alternatively referred to as an "RUL"). The RDC 342 is adapted to support multiple, configurable pipelines 340 and the multi-pass operation (i.e., buffer 330) by accessing and fetching (i.e., obtaining) one or more instructions from the RUL 346 and providing such instructions to configure at least one display pipeline 340 from a plurality of possible display pipelines, enabling the data to be processed more than once by one or more display pipelines. In one embodiment, the RDC 342 accesses the RUL 346 (fetching the instructions) in response to the one or more trigger signals 344 (real time DMA trigger signals or events generated by the last node in the pipeline 340 for example). It is contemplated that, if the network 316 did not have an RDC 342 associated therewith, the network 316 would have to reconfigure the pipeline one register at a time.

Figure 4:
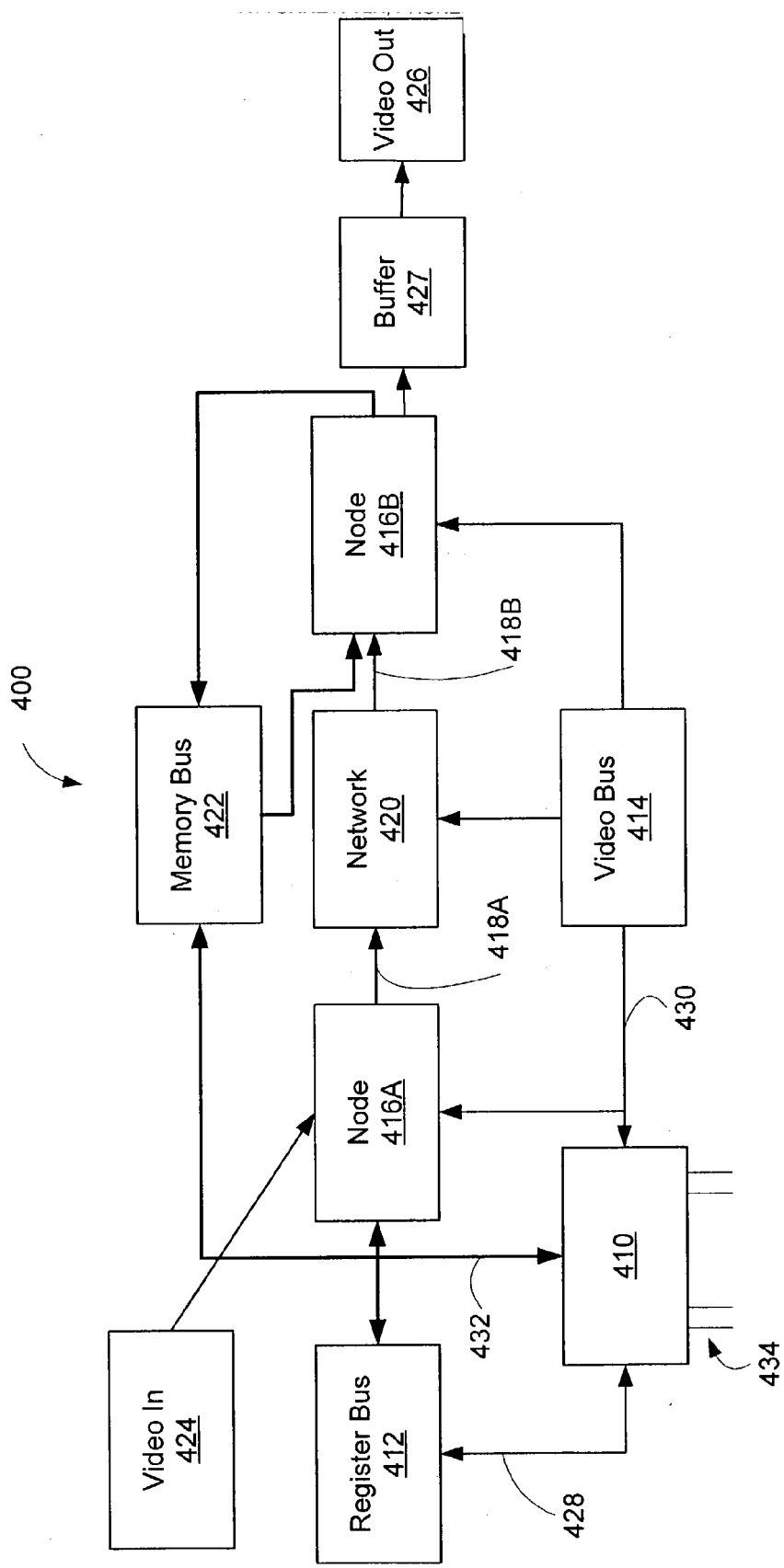
FIG. 4 illustrates one embodiment of a block diagram of a network environment for videoprocessing modules.

FIG. 4 illustrates one embodiment of a block diagram of a network environment (alternatively referred to as a "display engine") for video processing modules in accordance with the present invention. The network, generally designated 400, is adapted to support a multi-pass operation and comprises at least a register DMA controller, one or more nodes, one or more links, and one or more network modules. In this embodiment, the register DMA controller 410 is responsible for register access within the system 400. The register DMA controller 410 connects the register bus 412 (alternatively referred to as "RBUS") with the video register bus 414 (alternatively referred to as "VBUS"). More detail about the network is provided in U.S. Provisional Application Ser. No. 60/420,151 filed Oct. 22, 2002, titled "Network Environment for Video Processing Modules" and U.S. patent application Ser. No. 10/314,525 filed Dec. 9, 2002 titled "Network Environment for Video Processing Modules", the complete subject matter of each of which is incorporated herein by reference.

The system 400, in one embodiment, further comprises one or more nodes 416 (two nodes 416A & 416B are illustrated wherein this embodiment, node 416B is a capture module). Nodes 416 are modules that process video information (nodes 416A & 416B are illustrated having video-in signals 414 and video-out signals 426 respectively). Some examples of nodes comprise video scalers, 2D graphics compositors, video encoders, etc. In this embodiment, node 416B is coupled to frame buffer 427, adapted to capture at least one output of a display pipeline (alone or in combination with an algorithm), enabling the network to perform multiple processing of the data.

FIG. 4 further illustrates one or more links, interfaces or busses 418 (two links 418A & 418B are illustrated). In this embodiment, the links 418 comprise a set of signals or buses that tie or connect at least two nodes or one node and one network module together (link 418A is illustrated coupling node 416A to network module 420 while link 418B is illustrated coupling network module 420 to node 416B). The links 418 are adapted to transfer information using a predefined protocol.

Additionally, system 400 comprises one or more network modules 420 that, in this embodiment, are specialized nodes that don't perform video processing functions. Rather, the network module 420 connects at least two or more links 418 together, routing information between them. In general, the system 400 may include a number of pipelines (i.e., display pipelines) formed by chaining multiple nodes together. Each display pipeline starts at one or more nodes 416, where it is contemplated that each node has a memory interface to a frame buffer (not shown in FIG. 4). Functions are added to the pipeline by cascading more nodes to the pipelines. Finally, a pipeline ends at one or more nodes, where each such node is a desired output channel.

In accordance with the present invention, the register bus or RBUS 412 is connected to the video register bus or VBUS 414 through the register DMA controller 410. In this embodiment, both buses use identical signaling and protocols. The register DMA controller 410 acts as a slave to the RBUS 412 and forwards all the transactions to VBUS 414. In addition, register DMA controller 410 may perform one or more Register DMA operations, which comprises decoupling a host from video timing by automating mode changes.

In one embodiment, register DMA controller 410 includes four interfaces. There are two register bus interfaces, one interface 428 coupling the register DMA controller 410 to RBUS 412 and the other interface 430 coupling the register DMA controller 410 to VBUS 414. The third interface is a memory bus interface 432 coupling the register DMA controller 410 to the memory bus 422 (alternatively referred to as "MBUS"). The memory bus 422 is used to access register writes from an external memory. Finally the last interface 434 comprises an array of signals coming from at least one of the nodes 416, which are used as DMA triggers.

In accordance with one embodiment, display modes or pipelines are configured or changed using control registers. Instead of updating the display modes one at a time, the host uses the register DMA controller, feature or operation to automate the process. In this embodiment, the Register DMA comprises three entities: a register update list, a DMA descriptor and a DMA trigger as provided below.

Figure 5:
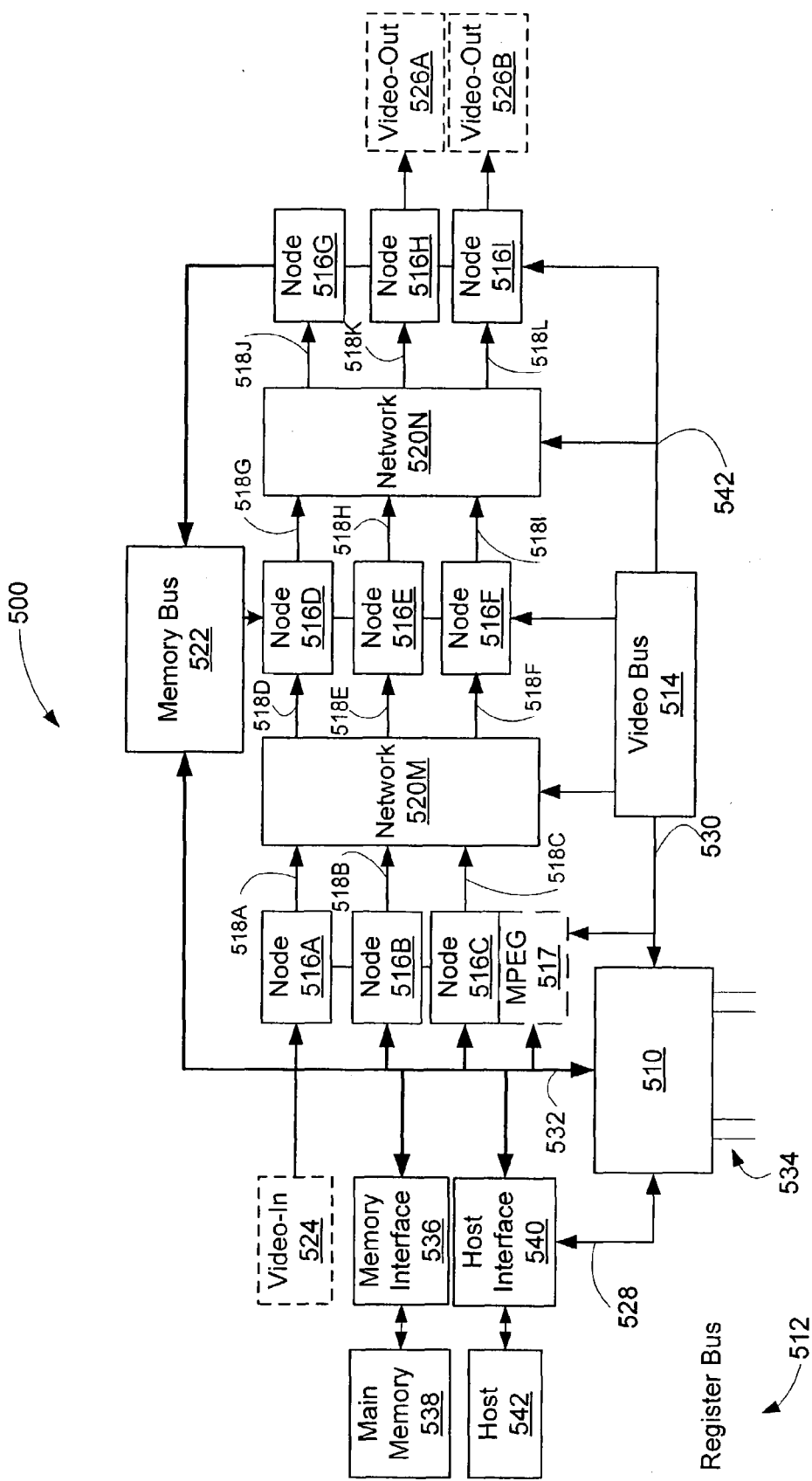
FIG. 5 illustrates another embodiment of a block diagram of a network environment in accordance with the present invention.

FIG. 5 illustrates another embodiment of a block diagram of a network or display engine according to the present invention. In this embodiment, the network, generally designated 500, processes video in a multi-pass fashion and is further adapted to support a pull data scheme. Register DMA controller 510 is responsible for register accesses within the network 500. The register DMA controller 510 connects the register bus or RBUS 512 with the video register bus or VBUS 514.

In this embodiment, the RBUS 512 comprises at least one video-in module 524 coupled to and communicating with at least one node (Node 516A for example). Further the RBUS 512 may comprise a memory interface 536 coupled to and communicating with at least the memory bus 522 (using memory bus interface 532 for example) and main memory 538; and a host interface 540 communicating with at least the memory bus 522 (using memory bus interface 532 for example), host 542 and register DMA controller (using interface 528 for example).

The network 500, in this embodiment, comprises a plurality of nodes 516 (nine nodes 516A-516I are illustrated). While only nine nodes are illustrated, more (or less) nodes are contemplated. Again, the nodes 516 process video information (node 516A is illustrated having video-in signals 524 communicating therewith, while nodes 516H and 516I are illustrated having video-out signals 526A and 526B respectively communicating therewith and node 516G is a capture device coupled to and communicating with the memory bus 522 adapted to capture processed video information). In this embodiment an optional MPEG decoder 517 is illustrated coupled to node 516C, and communicating with video bus 514, register DMA controller 510 and memory bus 522. In this embodiment, the capture module 516G captures the output of one or more display pipelines and stores it in a frame buffer in the main memory 538 using memory bus 522. In this manner the stored data may be processed one or more times by the network.

FIG. 5 further illustrates a plurality of links, interfaces or buses 518 (12 links 518A-518L are illustrated). Again, while 12 links 518 are shown, a different number is contemplated. In this embodiment, the links 518 comprise a set of signals or buses that tie at least two nodes 516 together and transfer information using a predefined protocol.

Additionally, network 500 comprises a plurality of specialized nodes or network modules 520 that, in this embodiment, connect at least two or more links 518 together, routing information therebetween. It is again contemplated that, in general, the network 500 may include a number of display pipelines formed by chaining multiple nodes together using the network modules 520 to switch between the nodes 516, thus varying or changing the pipeline. Each pipeline starts and ends at one or more nodes 516, where it is contemplated that each node has a memory interface 536 to a frame buffer. Functions are added to the pipelines by cascading that pipeline with more nodes.

In accordance with the present invention, the RBUS 512 is connected to the VBUS 514 through the register DMA controller 510. In this embodiment, both buses use identical signaling and protocols. The register DMA controller 510 acts as a slave to the RBUS 512 and forwards all the transactions to VBUS 514. In addition, the Register DMA controller decouples the host from video timing using automating mode changes to configure at least one display pipeline from a plurality of possible display pipelines.

Figure 6:
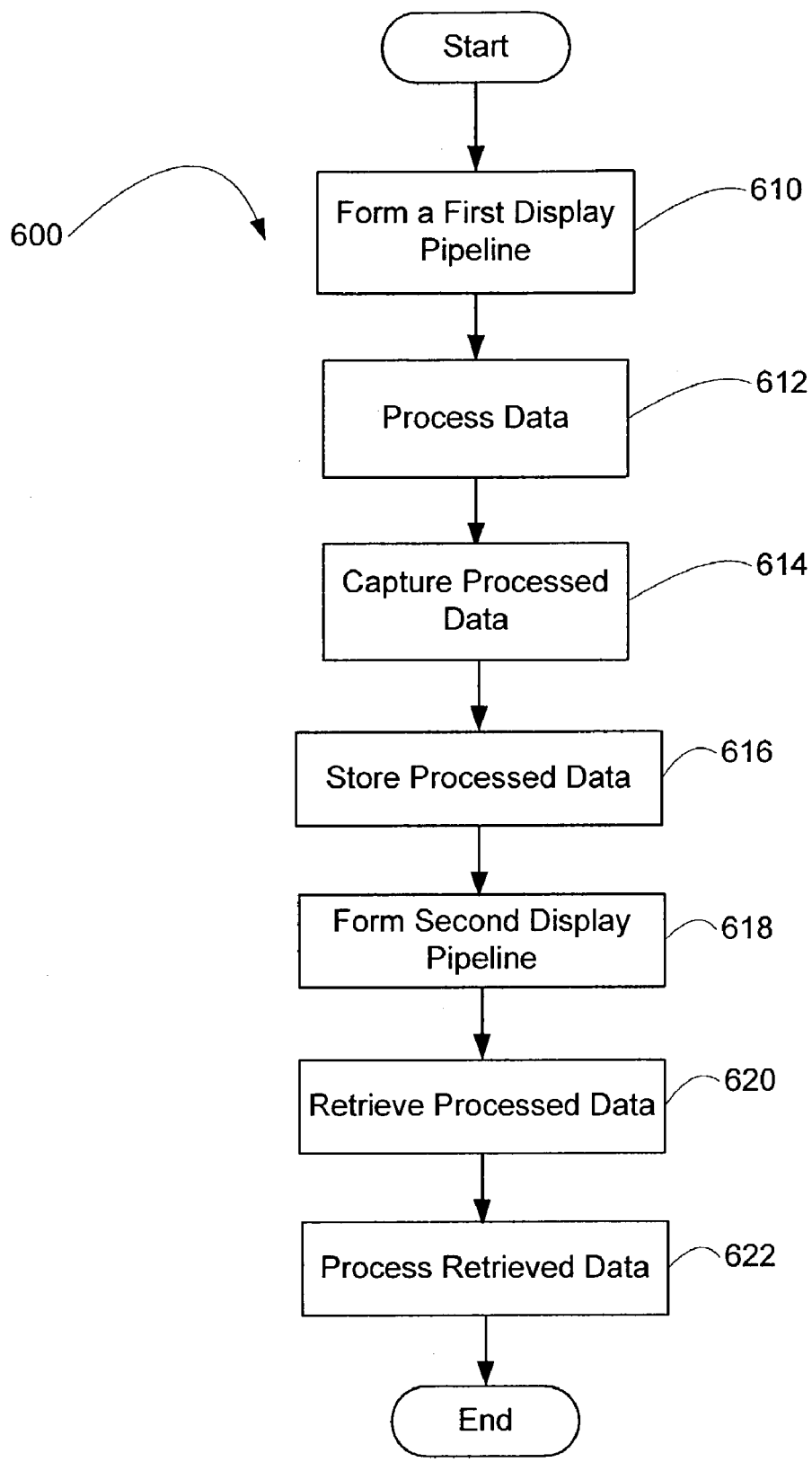
FIG. 6 illustrates one embodiment of a high level flow chart of a multi-pass method in accordance with one embodiment of the present invention.

FIG. 6 illustrates one embodiment of a flow diagram of a method of performing multi-pass operations, generally designated 600, supporting multiple streams of data in accordance with the present invention. In the illustrated embodiment, one display pipeline is formed from a plurality of possible display pipelines by the network as illustrated by block 610. The data is processed by the display pipeline and captured using a capture module as illustrated by blocks 612 and 614 respectively.

The processed data is stored in a storage module (a frame buffer for example) as illustrated by block 616. A second display pipeline is formed as illustrated by block 618. The stored processed data is retrieved from the stored module and processed by the second display pipeline as illustrated by blocks 620 and 622 respectively. It is contemplated that this multi-pass operation may be performed only once as provided previously or numerous times.

While only two display pipelines are discussed, more display pipelines are contemplated perform multiple processing of the data. Furthermore, in one embodiment the first and second display pipelines are different, processing the same data differently (i.e., performing a scaling operation during the first pass and compositing the data during the next pass for example). However, it is contemplated that the first and second display pipelines are the same, performing the same operation on the same data (i.e., scaling operation, where the display pipeline performs a scaling operation on the data during the first pass, stores it and then performs a scaling operation on the stored data during the second pass). It is also contemplated that such multiple processing may be performed on only one set of data, or two or more sets of data (where a new set of data is added to the stored data before each pass through the network). It is also contemplated that such multiple processing enables functions (i.e., display pipelines) to be timeshared.

Figure 7:
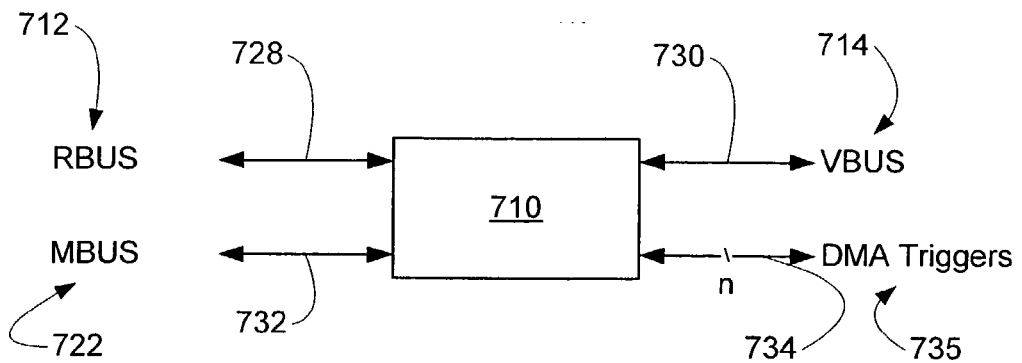
FIG. 7 illustrates one embodiment of a register DMA controller in accordance with one embodiment of the present invention.

FIG. 7 illustrates one embodiment of a block diagram of a register DMA controller 710 including four interfaces similar to that provided previously. There are two register bus interfaces, one interface 728 coupling the register DMA controller 710 to RBUS 712 and the other interface 730 coupling the register DMA controller 710 to VBUS 714. The third interface is a memory bus interface 732 coupling the register DMA controller 710 to the memory bus 722. Finally, interface 734 comprises an array of signals (0-n) coupled to at least one of the nodes 716, which are used as DMA triggers, and generally designated 735. More detail about the register DMA controller is provided in U.S. Provisional Application Ser. No. 60/420,140 filed Oct. 22, 2002, titled "Hardware Assisted Format Change Mechanism in a Display Controller" and U.S. patent application Ser. No. 10/300,370 filed Nov. 20, 2002 titled "Hardware Assisted Format Change Mechanism in a Display Controller", the complete subject matter of each of which is incorporated herein by reference.

The register DMA controller is adapted to support register DMA operations or functions in accordance with the present invention. Four interfaces are coupled to and communicating with the register DMA controller as provided previously: one interface coupling the register DMA controller to RBUS; one interface coupling the register DMA controller to VBUS; one interface coupling the register DMA controller to the memory bus; and one interface, comprising an array of signals, which are used as DMA triggers. It is further contemplated that, in this embodiment, the register DMA controller is comprised of at least five modules including a DMA engine; descriptors; RUL FIFO; one or more BUS multiplexers; and one or more filters.

In this embodiment, the DMA engine accesses one or more RULs from the main memory using the memory bus used to control the frame buffer and thus the multi-pass operation on the fly (i.e., in real time). The engine services the DMA channels according to the configuration specified by the descriptors. Further, each DMA channel consists of a trigger and a descriptor, such that, in this embodiment the number of DMA channels equals the number of triggers and descriptors.

The register DMA controller further comprises an RUL FIFO coupled to at least the DMA engine, which is adapted to buffer the bursty memory bus into the slower register bus. A bus multiplexer is coupled to the RUL FIFO and filter, and is adapted to convert RULs into individual register writes. In addition, the BUS mux arbitrates the video register bus between the DMA register writes and register accesses filtered from the register bus.

Figure 8:
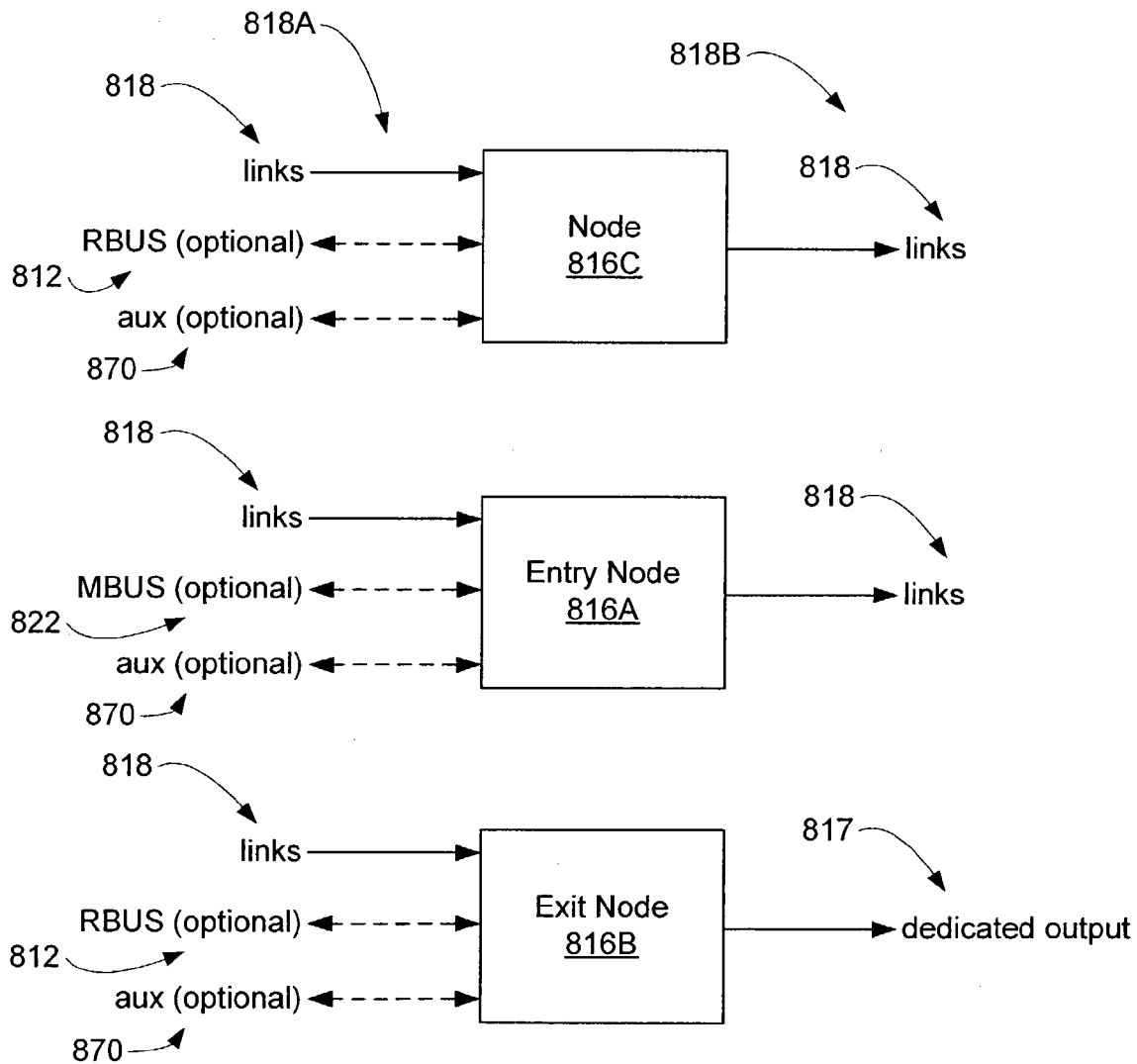
FIG. 8 illustrates embodiments of block diagrams of nodes in accordance with the present invention.

FIG. 8 illustrates different embodiments of the nodes, generally designated 816, used in one embodiment of the network. The network, in accordance with the present invention, is adapted to perform video processing functions similar to a display engine, including video playback, scaling, encoding, etc. It is contemplated that each node 816 in the network may be generally divided into three categories according to its position in a display pipeline: entry, exit, and intermediate. Video data enters a display pipeline at an "entry node" designated 816A and leaves at an "exit node" designated 816B. All the nodes in-between are referred to as "intermediate nodes" or "nodes" designated 916C. Examples of entry nodes 816A include MPEG display feeders, playback engines, etc. Examples of exit nodes 816B include video encoders, capture engines, etc. Examples of intermediate nodes 816C include scalers, compositors, etc. It is further contemplated that the position of each node in the pipeline configuration is not fixed; rather its position varies depending on the display pipeline (i.e., an entry node in one pipeline may be an intermediate node in another display pipeline).

As illustrated, the nodes 816 each generally include at least one input and output interface, bus or link 818 coupled thereto and communicating therewith. It is contemplated however that each node 816 is adapted to have multiple input or output links 818A & 818B coupled thereto and communicating therewith (a compositor for example has multiple input links). Furthermore, each node 816 may also have an optional RBUS 814, MBUS 822 or some other optional auxiliary interface 870 (a DMA trigger for the register DMA controller for example) communicating therewith. If the node 816 is an entry node 816A, it is contemplated that the input link is an MBUS interface 822 as illustrated. For exit nodes 816B, the output is replaced by a dedicated output 850 (e.g., a memory interface for a capture engine or an analog video output for a video encoder).

As provided previously, a display pipeline in the network starts or begins at one or more entry nodes 816A. The entry node 816A is responsible for feeding video to the downstream nodes 816 and includes, for example, MPEG display feeders and playback engines. In one embodiment, the input to an entry node 816A may comprise RBUS and memory interfaces. Its output may comprise one or more output links 818B. In addition, the entry node 816A may include one or more auxiliary interfaces 870 such as a DMA trigger for the register DMA controller.

The intermediate node 816C, in one embodiment, may have specific functions comprising scaling, compositing, etc. One or more nodes are added to a display pipeline as its features are used to satisfy certain output requirements. In general, the input and output of an intermediate node 816C comprises one or more links 818A & 818B as provided previously. In addition, the intermediate node 816C may have an optional register bus interface or some other auxiliary interface 870 coupled thereto and communicating therewith.

As provided previously, the display pipeline ends at exit node 816B, which may comprise a video interface such as a composite signal encoder or capture engine for example. In general, the inputs to an exit node 816B consist of an input link 818, an optional register bus 812, and a video output or a memory bus interface 870. In this embodiment, the output is captured by a capture device, stored and processed by a second display pipeline.

In addition to the functions described previously, the exit nodes 816B may include some debugging functions. For example, a checkpoint register may be written into control packets and read by the register bus 812. This register is programmed in every field to a field dependent number. At the same time, a host may check the progress of the video packets by monitoring this register through the register bus 812.

FIG. 9 illustrates one embodiment of a network module 920 in accordance with the present invention. In this embodiment, the network module 920 comprises a plurality of network interfaces, buses or links generally designated 918 and switches, described in greater detail below. In this invention, one or more network modules are used to connect one or more nodes, forming at least one display pipeline from a plurality of possible display pipelines. Since the nodes may be re-configured, it is contemplated that display pipelines having different functionality may be implemented for different applications. In other words, the display pipelines are dynamic and not static.

The network interfaces or links 918, in this embodiment, comprise input and output links 918A & 918B respectively, and an optional register bus 912. In this embodiment, m input links 918A and n output links 918B are illustrated, where m and n may be the same or different. It is contemplated that m may be greater than, equal to or less than n (i.e., the number of input links 918A may be greater than, equal to or less than the number of output links 918B).

It is contemplated that different types of network modules may be used within the register DMA controller or display engine. The network module 920, in accordance with the present invention, is comprised of an array of switches coupled together using predefined topology. This topology determines the network module's routing capabilities, as well as the implementation cost.

Many modifications and variations of the present invention are possible in light of the above teachings. Thus, it is to be understood that, within the scope of the appended claims, the invention may be practiced otherwise than as described hereinabove.

The invention claimed is:

1. A network adapted to perform multiple processing of data comprising:
    a first display pipeline that is formed in real time from a plurality of possible display pipelines and that performs at least a first processing step on received data;
    a buffer that stores the processed data; and
    a second display pipeline that is formed in real time from a plurality of possible display pipelines and that performs at least a second processing step on the data processed by the first display pipeline and stored in the buffer; and
    wherein the first display pipeline is formed from a first three or more nodes and wherein the second display pipeline is formed from a second three or more nodes, and wherein each of the first three or more nodes forming the first display pipeline is different from each of the second three or more nodes forming the second display pipeline; and
    a third display pipeline that is formed in real time from the plurality of possible pipelines wherein the third display pipeline performs one of the first processing step or second processing step on another set of received data while either the first or second pipeline are formed, wherein the third pipeline comprises three or more nodes; and
    wherein the data comprises a first data stream with a first video frame rate, a second data stream with a second video frame rate, and a third data stream with a third video frame rate.

2. The network of claim 1, wherein an algorithm is used to perform said multiple processing.

3. The network of claim 1, wherein a plurality of display pipelines are used to perform steps on the data.

4. The network of claim 1, wherein the data is processed according to at least one register write instruction.

5. The network of claim 4, comprising a register DMA controller adapted to provide said register write instruction.

6. The network of claim 1, wherein the first display pipeline is dissolved after performing the first processing step on received data, wherein dissolving the first display pipeline comprises disconnecting each node from forming the first display pipeline.

7. A method of performing multiple processing of data in a network comprising:
    (a) forming a first display pipeline from a plurality of possible display pipelines, wherein the first display pipeline comprises three or more nodes;
    (b) processing the data in said first display pipeline;
    (c) storing said processed data;
    (d) forming a second display pipeline from a plurality of possible display pipelines, wherein the second display pipeline comprises three or more nodes;
    (e) retrieving said stored processed data;
    (f) processing at least said stored processed data in said second display pipeline; and
    wherein the first display pipeline is formed from a first plurality of nodes and wherein the second display pipeline is formed from a second plurality of nodes, and wherein each of the first plurality of nodes is different from each of the second plurality of nodes; and
    forming a third display pipeline in real time from the plurality of possible pipelines wherein the third display pipeline simultaneously performs one of the first processing step or second processing step on another set of received data while either the first or second pipeline are formed, wherein the third pipeline comprises three or more nodes; and
    wherein the data comprises a first data stream with a first video frame rate, a second data stream with a second video frame rate, and a third data stream with a third video frame rate.

8. The method of claim 7 comprising repeating steps (a)-(f).

9. The method of claim 7 comprising forming said first and second display pipelines according to at least one register write instruction.

* * * * *